(12) United States Patent
Cox et al.

(10) Patent No.: US 8,238,532 B1
(45) Date of Patent: Aug. 7, 2012

(54) METHOD OF AND SYSTEM FOR DISCOVERING AND REPORTING TRUSTWORTHINESS AND CREDIBILITY OF CALLING PARTY NUMBER INFORMATION

(75) Inventors: Patrick M. Cox, Newberg, OR (US); Richard J. Greene, Portland, OR (US); Joseph H. Bockelman, Springboro, OH (US); Shreyas Saitawdekar, Portland, OR (US)

(73) Assignee: TrustID, Inc., Portland, OR (US)

( * ) Notice: Subject to any disclaimer, the term of this patent is extended or adjusted under 35 U.S.C. 154(b) by 206 days.

(21) Appl. No.: 12/783,405

(22) Filed: May 19, 2010

Related U.S. Application Data

(60) Provisional application No. 61/179,629, filed on May 19, 2009.

(51) Int. Cl.
*H04M 15/00* (2006.01)
*H04M 17/00* (2006.01)
(52) U.S. Cl. .......... 379/114.14; 379/127.02; 379/144.03
(58) Field of Classification Search ............. 379/114.14, 379/121.01, 143.01, 144.03, 127.01, 127.02
See application file for complete search history.

(56) References Cited

U.S. PATENT DOCUMENTS

| | | | | |
|---|---|---|---|---|
| 5,699,416 | A * | 12/1997 | Atkins | 379/115.01 |
| 5,963,625 | A * | 10/1999 | Kawecki et al. | 379/127.01 |
| 6,307,926 | B1 * | 10/2001 | Barton et al. | 379/189 |
| 6,947,532 | B1 * | 9/2005 | Marchand et al. | 379/114.14 |
| 7,912,192 | B2 * | 3/2011 | Kealy et al. | 379/114.14 |
| 2007/0271339 | A1 * | 11/2007 | Katz | 709/204 |

* cited by examiner

*Primary Examiner* — Binh Tieu
(74) *Attorney, Agent, or Firm* — Sterne, Kessler, Goldstein & Fox p.l.l.c.

(57) ABSTRACT

A method of and system for discovering and reporting the trustworthiness and credibility of calling party number information, such as Automatic Number Identification (ANI) or Calling Number Identification (Caller ID) information, or for inbound telephone calls. The disclosed method entails the use of real time telephone network status and signaling, network data, locally stored data, and predictive analytics. Practice of the disclosed method is neither detectable by nor intrusive to the calling party, and the method can be implemented into existing enterprise, telecommunications, and information service infrastructures.

52 Claims, 2 Drawing Sheets

METHOD OF AND SYSTEM FOR DISCOVERING AND REPORTING TRUSTWORTHINESS AND CREDIBILITY OF CALLING PARTY NUMBER INFORMATION

RELATED APPLICATION

This application claims benefit of U.S. Provisional Patent Application No. 61/179,629, filed May 19, 2009.

COPYRIGHT NOTICE

© 2010 TrustID, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This disclosure relates to calls placed in telecommunication and information service networks and, in particular, to establishing, for call recipients, the credibility of incoming calls by discovery of and reporting on the credibility of Automatic Number Identification (ANI) information in-line with the incoming calls in progress.

BACKGROUND INFORMATION

ANI (Automatic Number Identification in North America is the 10-digit billing telephone number of the caller) was made available in 1967 to a business telephone customer for toll free circuits (800 or "Inward-WATS") to inform the business telephone customer who was calling because the called business was paying the toll costs of the incoming call. ANI and Calling Number Identification (Caller ID) were made available as products to residential and small business telephone customers to provide them with the 10-digit telephone number of the calling party, and by the late 1980s in some cases the caller's name. Businesses such as banks, call centers, and government entities such as 911 service centers have relied on ANI information as a factor in identity determination; as an element in location discovery; and for call routing assistance, workflow efficiency, and fraud mitigation.

The ability to falsify ANI has been available for over a decade, but only to sophisticated and mostly regulated telecommunications carriers and very large business Users subscribing to expensive multi-line Primary Rate Interface (PRI) telephone circuits. ANI control has a legitimate use. As an example, a large business uses ANI control to display its main telephone number on all outgoing calls from its multiple lines.

The ability to falsify ANI stems from interaction of new technologies with legacy telecommunications architecture. Before the advent of information services network (e.g., Internet) telephony and deregulation, the telecommunications network was a closed system with one or both of a limited number of trusted FCC- and Public Utility Commission-licensed telecommunications companies adhering to a finite set of standards. Telecommunications decentralization and deregulation, as well as Internet telephony (Voice over Internet Protocol (VoIP) technology), have exposed this legacy architecture to an abundance of new telephony products and services that inject calls and calling data from outside the control of the legacy telecommunications network. The telephony network then delivers to its destinations these calls and associated information, in most cases, without checking their validity. Consequently, this system supplies an opening for criminals to easily place calls with fabricated or "spoofed" ANIs for nefarious purposes. ANI fabrication or spoofing is a low cost, powerful penetration tool used to impersonate identity and location. Multiple companies and, more importantly, technologies exist for the sole purpose of enabling anyone, anywhere, to spoof ANI and Caller ID for pennies each call.

Throughout the past 25 years, telecommunication Users have relied on ANI and have built vital business processes around the incoming calling party telephone number. In addition, most businesses have developed sophisticated inbound telephone answering systems (known as IVR) that answer calls and are programmed with rules-based decision parameters grounded on the ANI. Now, relying on non-validated ANI undermines these critical marketing, technical, and security processes used for authentication, identity, location, and activation in today's financial services, general business, and government enterprises. As one specific industry example, major financial institutions now have compromised critical operations that were built upon the trustworthiness of ANI. Applications such as bank-card activation, credit issuance, money transfers, new account applications, and customer service have all relied on the layer of security ANI has provided. Decisions made using the current non-validated ANI place an enterprise at risk of diminished revenue by limiting new product offerings and increased losses from fraud. Attempted fraud exceeds $50 billion each year in the U.S. alone. Identity fraud is the key driver in these losses. Today, more bank card activation fraud occurs by telephone than by other remote banking channels combined (i.e., not face-to-face), such as ATM, e-mail, and world wide web.

There are several ways in which a motivated individual can take advantage of the current state of the art to manipulate ANI. VoiceXML applications let Users change ANI and Caller ID. An open source PBX software application, such as Asterisk, allows users to manipulate ANI. Competitive service providers and telecommunication carriers can set their own ANI. Moreover, certain companies exist today for the sole purpose of allowing ANI and Caller ID to be spoofed and falsified. Businesses such as Camophone, Telespoof, Covert-Call, and dozens of others offer widely available ANI and Caller ID spoofing for pennies each call.

The consequences of prevalent, facile manipulation of ANI provide motivation to restore integrity to the use of ANI. One major consequence is financial fraud, which is on the rise and is driven primarily by identity fraud. Traditional financial services customer verification tools such as information-based authentication are being compromised. Most financial service companies use ANI as the apex identifier in their telephonic decision-making. If false trust is placed in spoofed ANI, downstream decisions are compromised. Decisions made using current non-validated ANI is placing companies at risk, limiting new product offerings, and increasing losses from fraud. The disclosed approach restores the value of ANI by reestablishing the security of telephone transactions.

There are more financial transactions conducted over the telephone than are conducted on the world wide web, even in today's Internet pervasive environment. Of the more than two billion telephone calls placed annually to U.S. financial institutions alone, nearly all rely on ANI for security, location information, call routing, and identity authentication. Knowing the caller's location or that the caller is in possession of an actual telephonic device is the foundation and an important factor for trusted telephone commerce.

A major nonfinancial consequence is criminal mischief. A Washington state man was sentenced to 30 months in prison, after using ANI spoofing to send SWAT teams to the houses of a dozen innocent, unknowing individuals.

The following is a chronological summary of the evaluation of ANI spoofing and legislative attempts to combat it.

In 2003, VoiceXML applications let Users change ANI, and, at the same time, VoIP telephony entered the marketplace. An open source PBX software application, called Asterisk, allows users to manipulate calling party number information. Asterisk is a software implementation of a telephone private branch exchange (PBX) originally created in 1999 by Mark Spencer of Digium. As an example, if the ANI field is left blank by the Asterisk or carrier switch, any user can easily manipulate the Caller ID information using Asterisk, thereby populating the ANI field with the same misinformation as the spoofed Caller ID. Asterisk allows Users to send spoofed ANI in the same way that businesses had been setting their ANI with PRI lines.

In 2004, a new ANI spoofing service, named Star38, (using VoIP and Asterisk) was launched and gained attention from worldwide mainstream media after USA Today published in its daily paper a front-page article about the service. The same year, others followed such as Camophone, Telespoof, and CovertCall. Over the next year, a dozen additional services started delivering ANI spoofing services.

By 2006, the FCC began investigations into these services, and the House of Representatives and the Senate considered several bills attempting to outlaw use of ANI spoofing for fraudulent purposes. ANI spoofing gained the attention of the mainstream media as SpoofCard announced the cancellation of an account belonging to Paris Hilton that was used to break into the voicemail of Lindsay Lohan to harass her.

On Jun. 27, 2007, the United States Senate Committee on Commerce, Science and Transportation approved and submitted to the Senate calendar Senate Bill S.704, which would have made spoofing ANI a crime. Titled the "Truth in Caller ID Act of 2007," the bill would have outlawed causing "any caller identification service to transmit misleading or inaccurate caller identification information" via "any telecommunications service or IP-enabled voice service." Law enforcement would have been exempted from the rule. A similar bill, HR251, was recently introduced and passed in the House of Representatives. It had been referred to the same Senate committee that approved S.704. The bill never became law because the full Senate never voted on it; it was added to the Senate Legislative Calendar under General Orders, but no vote was taken, and the bill expired at the end of the 110th Congress. On Jan. 7, 2009, Senator Bill Nelson (FL) and three co-sponsors reintroduced the bill as S.30, the Truth in Caller ID Act of 2009, which was the bill referred to the same committee in the Senate. The House of Representatives passed the Truth in Caller ID Act of 2010 in April 2010, but the bill has yet to be reconciled with the Senate version. The new bill states that Caller ID may not be spoofed to be intentionally misleading or inaccurate. No federal bill has yet to be signed into law. Several of the States have passed bills making misleading Caller ID spoofing illegal.

What is needed is a method to detect or report the accuracy and truthfulness of ANI.

SUMMARY OF THE DISCLOSURE

A method of and system for discovering and reporting the trustworthiness and credibility of calling party number information, such as Automatic Number Identification (ANI) or Calling Number Identification (Caller ID) information, or for inbound telephone calls entails use of real time telephone network status and forensics, network data, locally stored data, and predictive analytics. Practice of the disclosed method is neither detectable by nor intrusive to a calling party, and the method can be implemented into existing enterprise, information services, and telecommunications infrastructures.

The disclosed method performs ANI analysis with the calling party's telephone or telephonic device in a transitional state between an actual or a virtual on-hook condition and an answered condition, and is implemented as follows in a preferred system. When the first indication of an incoming call is detected by a User itself or equipment implementing an Application Programming Interface to communicate with the System, the ANI, along with other information such as the dialed number (DNIS) and incoming trunk identification information, is transferred to the System, using an Applications Programming Interface (API). The disclosed System quickly begins decomposing the calling party number (i.e., supposed telephone or billing number) to check the calling party number validity, check call velocity, compare the originating switch identifier with the NPA-NXX of the calling party number, and check other call number attributes. Calling party number validity relates to format issues for the North America Numbering Plan, such as, for example, whether the area code starts with an impermissible digit ("1" or "0") or whether the calling party number contains greater or fewer than 10 digits. Calling velocity relates to whether an excessive number of calls have been placed by a calling party to one or more Users within a specified unit time period. The NPA-NXX of a calling party number relates to the breakdown of 10-digit number, in which NPA refers to the three-digit numbering plan area (area code) and NXX refers to the three-digit central office (exchange) code.

If a specified one or number of such attributes suggest an anomalous or suspicious calling party number, the disclosed System determines noncompliance of the calling party number, and the System can terminate the procedure and indicate to the User that a calling party number is of low credibility. To continue the analysis of the calling party number, the disclosed System begins to discover the origins of the calling party number, such as telecommunications carrier, line type (e.g., business, government, residence), geo-location, network conditions, and network condition call progress message patterns. The System next begins to probe the calling party number by examining network signaling including call forward messages to ensure probing of the received calling party number and using the telecommunications network by calling and signaling to detect and record status, messages, line conditions (e.g., busy signal), hook switch status, answer and message timings, call forward actions and responses. The origins of the calling party number and the calling number network responses are used to create a real time pattern of all the above elements. The signaling and condition patterns represent, therefore, characteristic "thumbprint" patterns of the calling number telephone network and its call progress functions. The real time pattern is then compared against a historical database of expected call patterns of valid and invalid ANI decomposing processes. Based on the closeness of patterns and the degree of match, a confidence metric is calculated using statistical probabilities. The confidence metric is used by one or both of the User and the System to determine the validity of the ANI. Once the ANI is validated, the recipient can have a higher degree of confidence in the validity of the calling party number and place more trust in it.

The following presents examples of uses, and systems that would benefit from implementation, of the disclosed method.

In the banking industry sector, credit, debit, ATM, and gift cards are mailed to customers. When these cards are received by the recipient, most banks request that the recipient confirm receipt of the card by "activation" of the card. The most preferred method of activation entails placement of a call by a card recipient from his or her home telephone to a toll-free (800) number of the bank to activate the newly received card. The use of a toll-free (800) service by the bank ensures the transmission of ANI information to the bank, even if the consumer has a feature on his or her telephone line to "block Caller ID transmission." The transmitted ANI information is one factor used by the banks to prove that the card in fact is in the intended recipient's possession.

Banks can also use additional factors of,authentication to further identify and locate the caller by one or both of asking for personally identifiable information (PII) and relying on voice biometrics, primarily as a consequence of the now unsecured and "spoof able" nature of ANI. PII may be, for example, a social security number or date of birth. Using PII to conduct information-based authentication has its challenges and risks. Information based authentication using PII such as social security numbers or a mother's maiden names exposes the bank to additional risk. PII information is regulated, and, if the PII information in the bank's possession is lost or stolen from the bank, large costs and fines can be levied against the bank by government entities enforcing current data breach laws. Moreover, because of the high number of past data breaches, a very high percentage of consumers have had their PII data compromised already, making PII available to criminals for use in ID theft. (In 2009, the Identity Theft Resource Center reported 493 breaches and 300 million records exposed.) In addition, another aspect of PII access has further eroded the value of information-based authentication. Social networking websites such as FaceBook, LinkedIn, MySpace, Ancestry, Twitter, and dozens more all contain and share PII with the public, further de-valuing the use of PII knowledge as a tool for identity authentication. ANI is one of the authentication tools available to banks that are not PII based for telephone-based transactions. The disclosed method helps restore the value lost to spoofing and fraudulent ANI transmissions, providing a powerful new tool to banks to authenticate their customers by again using and trusting validated ANI as a factor in authentication for the telephone channel.

The disclosed method and system return the trust, credibility, and security to incoming telephone calls by discovering and reporting on inaccurate ANI information in-line with a call in progress, allowing trust to be correctly placed in real time that the ANI information has not been altered or set incorrectly or "spoofed" by the caller or a telecommunications carrier. The disclosed system and method can be used by business, government, and consumers alike, as well as provide an existing telecommunications carrier a tool to improve the security and value of its network.

Additional aspects and advantages will be apparent from the following detailed description of preferred embodiments, which proceeds with reference to the accompanying drawings.

BRIEF DESCRIPTION OF THE DRAWINAS

DETAILED DESCRIPTION OF PREFERRED EMBODIMENTS

In telephony, the calling party number information is delivered and described in many different ways. This document uses the acronym "ANI" to describe the following types of calling party number information systems and descriptions, unless any one of the following terms needs to be used specifically to communicate clearly: Caller ID or CID; Calling Party Number or CPN; Calling Number Identification (Identifier) or CNID; Calling Party Identification (Identifier) or CPI; Automatic Number Identification (Identifier) or ANI; Automatic Number Identification Information Digits or ANI II, ANI 2, ii digits; Billing (Billed) Number or BN; Caller (Calling) Line Identification or CLID; A-Number; and Calling Party or CP. The term "call" is used in this document to define any connection over a telecommunications or an information service network and includes, but is not limited to, landline, wireless, modem, facsimile, Session Initiation Protocol (SIP), and Voice over Internet Protocol (VoIP) transmissions.

The Problem the Disclosed Method and System Solve

With the deregulation and de-centralization of the telecommunications landscape and the introduction, proliferation, connection, and integration of information service network telephony (e.g., Internet VoIP) into the Public Switched Telephone Network (PSTN), combined with the ability to control the transmission of a caller's telephone number to a called party in the many forms (most commonly called ANI and Caller ID), is now controllable by the calling general public.

Before the dramatic marketplace changes outlined in this section, a calling party's number was securely transmitted by a regulated telecommunications company to the called party.

This newly found control of the telephone network by the public at large, mainly through use of VoIP connections, has caused the recipient of a telephone call to distrust in the accuracy and truthfulness of a calling party's telephone number.

Figure 1:
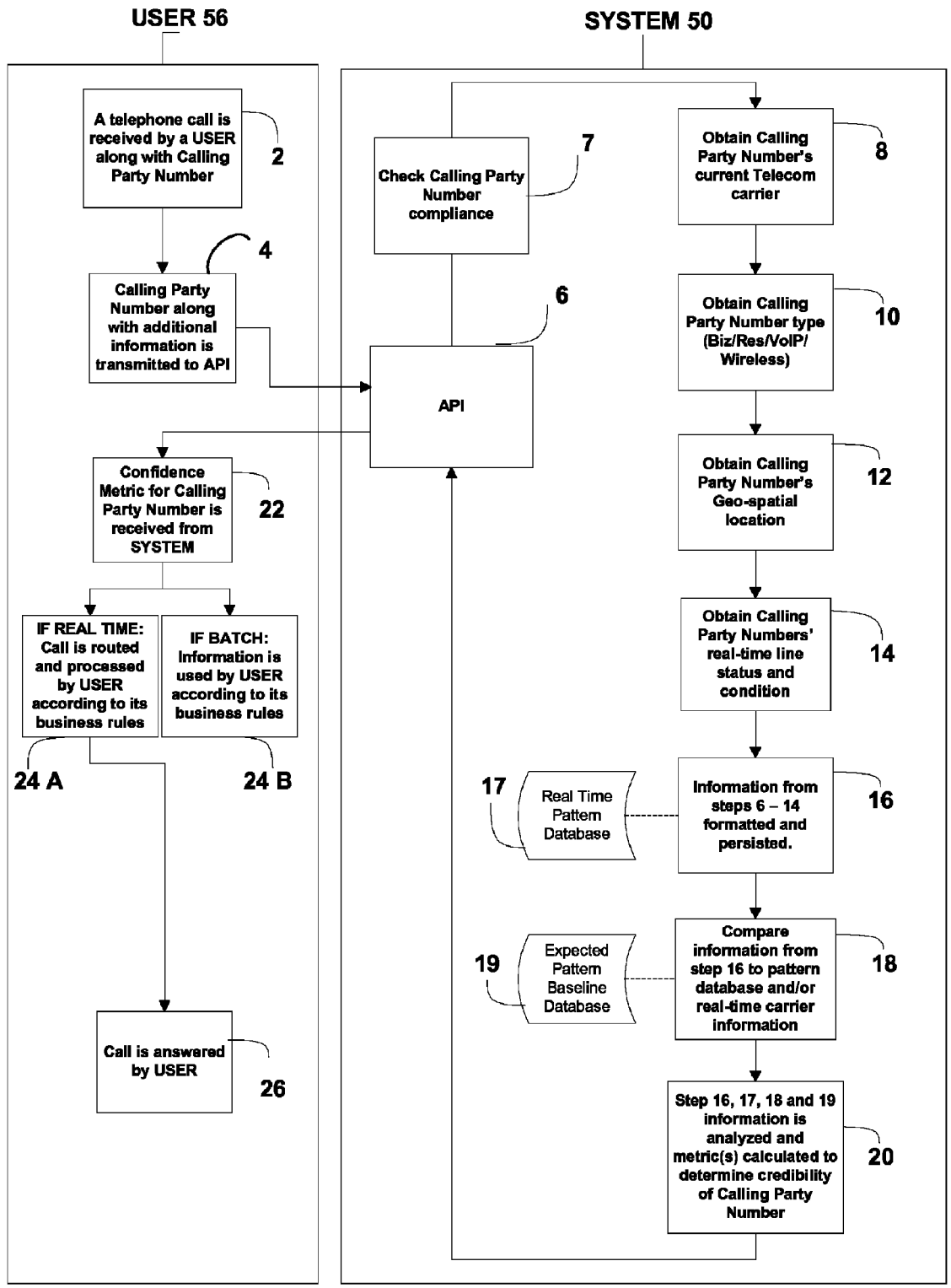
FIG. 1 is a hybrid system process block and method step flow diagram of the disclosed method of and system for determining trustworthiness and credibility of calling number information relating to calls placed in a telecommunications network.

The following description of implementations of preferred embodiments is presented with reference to FIG. 1, which is a hybrid system process block and method step flow diagram. The diagram includes User related function blocks and system related process module blocks, as indicated in FIG. 1.

An Incoming Call 2 block represents an event in which a called party (User) receives a telephone call delivered by a telecommunications carrier from a calling party. The carrier delivers an ANI, (usually 10 digits long in North America) along with or before the voice portion of that call is connected to the called party.

A Transmission 4 block represents a User (such as a bankcard activation center or a 911 emergency services call center) transmitting the ANI to the System before the call is answered and while the calling party hears one or more ringing tones. This transmission before the call is answered (goes off-hook) by the User enables the calling party's telephone to be in a more predictable and detectable transitional state. This transmission step may be performed through any conventional data transmitting technique, such as over the Internet with a virtual private network connection, a remote or private circuit connection, or a local area network using any data transmission model such as HTTPS, SOAP, or XML. This transmission step is not limited to offering only ANI information. For example, the User may transmit the time of day, trunk number, ANI II digits, dialed number information (DNIS), SIP header and routing information, transaction number, unique identifier, or other information or data that may be helpful to the System, or to the User if re-transmitted back to the User, for example, to assist in re-associating a transmission with the calling party's call.

An Application Programming Interface (API) 6 block represents the User of the System receiving the data and information described with reference to Transmission 4, and then re-transmitting the data in a standardized format to the System. The System sends, to the User, data and information in a standard format that are described in a Determine 20 block of the System. API 6 could make format standardization of data in any known manner, including fixed field database structure, name/value pairs, XML, tab delimited, comma delimited, fixed width, or variable length. API 6 could make the subsequent transmission in any known manner, providing an electronic data connection to an active database or data management system such as Oracle or a proprietary or open source software program. The machine or computer may record the data on any known information storage device, including RAM, magnetic media (e.g., a hard disk drive), or any other electronic medium.

A Calling Party Compliance block 7 represents decomposition of the calling party number to check its validity, check call velocity, compare the originating switch identifier with the NPA-NXX of the calling party number, and check other call attributes. If it determines noncompliance of the calling party number, the System can terminate the procedure and indicate to the User that a calling party number is of low credibility. Otherwise, System operation proceeds as described below.

A Carrier Discovery 8 block represents a query of available network-accessible Local Number Portability (LNP) databases, such as the ones maintained by North American Numbering Plan Administration (NANPA), NetNumber, or TNS, to determine the current telecommunication carrier that services and owns the ANI number delivered in Transmission 4 from the incoming call placed to the called party in Incoming Call 2. This query could be performed via the Internet using a secure TCP/IP protocol or other methods, such as Signaling System 7 (SS7), ATM, ITU-T, SIGTRAN, or Enum. In another variation, a locally stored database could be queried to determine the current telecommunication carrier that provisioned the line of the ANI from the incoming call placed to the called party in Incoming Call 2.

A Line Type 10 block represents use of databases of telephone circuit types (such as, for example, business, wireless, residential, pay telephone, prison telephone, VoIP, satellite, pre-paid, post-paid, SIP, or pager) and information from other process modules or steps in the System such as Carrier Discovery 8 to assign a Line Type 10 to the ANI from Incoming Call 2. A Line Type 10 database is created by assigning, analyzing, and building a compiled database of ANI Line Types from commercially available database(s) such as TargusInfo, InfoUSA, Acxiom, or others with databases maintained by telecommunication carriers or third party providers, such as Verizon, TNS, or NANPA, and from proprietary databases developed from primary research or housed on behalf of clients (numbers on which fraud has been previously committed or numbers assigned by the client as high risk). The compilation is performed by analysis of source quality metrics or other known techniques. These databases could be network (Internet, SS7) accessible or locally stored in the System or by combination. In another embodiment, Line Type 10 would be determined from a carriers business practices. Such an example would be Integra Telecommunications, which, at the time of this writing, provides only business line types.

Geo-location 12 block represents determination of the city and state, latitude, longitude, and other geospatial information about the ANI. The geo-location is determined by querying one or more databases, such as Telcordia, that provide routing guides using available rate center data providing geospatial data inferred from an ANI. International numbers can also be identified, using country-calling codes. Use of attribute data and vector data models collected, compiled, and analyzed for specific areas such as LATAs (Local Access Transport Areas) or a carrier's switch serving areas enables inference of discrete locations from the analysis of data contained in the attributes associated with each ANI.

In an alternative embodiment, the determination of the caller's location can also be made by use of the Home Location Register (HLR) or other carrier-based real time database to determine which switch or end office or what wireless telephone offices are managing the call, and then to calculate the location of that switch. In a second alternative embodiment, a third party geospatial technology or vendor such as Geografx can be used to provide the geo-location of the caller. In a third alternative embodiment, the determination of the callers location can also be made utilizing IP address information where available. Standards such as IPv6 define routable home IP address information that can be used to determine geo-location information. Geo-location may be returned as Geo-location 12 data that are used to determine the serving switch to assist in call pattern recognition and creation represented by a Storage 16 block, a Real-Time Pattern 17 block, a Compare 18 block, an Expected Patterns 19 block, and Determine 20 block.

A Network Condition 14 block represents placement by the System of one or more outbound calls to the telephone number represented by the received ANI in Incoming Call 2 before the incoming call to the User is answered, which is represented by a Call Answer 26 block. This enables the calling telephone line to be in a predictable and detectable state because call waiting and other features are unavailable at this time on most line types during this unanswered off-hook ringing state. These calls should be placed from a switch that uses SS7 services or with a VoIP service allowing for SIP and/or SIP-T messaging or other available network connection types to allow for the maximum amount of call progress messaging and maximum number of details to be recorded such as call forwarding and route information and status. Network condition, line-status, call progress information, and call progress messages and their associated timing information are collected in Network Condition 14. The outbound call(s) query the current network condition of the telephone number (such as, for example, busy, ring then answer, call forward then answer, and ringing no answer). Such calls produce a series of conditions, each with a status and response with specific timing associated with each call progress message or network state.

In addition to network messages, available audio energy detection and determination methods are used, and the results are analyzed with the use of dedicated or shared digital signal processing (DSP) hardware and/or software to determine the type of answer condition and line type (such as a answering machine, fax machine, carrier-based voicemail, business line, automated attendant, or call progress tones including intercept tones, reorder tones, or guard tones). These status, conditions, and responses are categorized with associations and timings for later analysis performed in Determine 20. In another variation, data connections (such as SS7 or virtual private network) to telecommunications providers may provide additional information as to the network condition of the ANI received in API 6.

Connections to the telecommunications or third party provider may use new methods (such as real-time call detail record (CDR) analysis), existing methods (such as a CALEA interface or home location registers (HLR)), or billing ports and computer telephony interface (CTI) ports to access line status information. An example of the type of query and response in this variation would be to query a carrier through currently available means, such as a VPN, dedicated circuit, or SS7 connection, to determine whether a specific ANI is currently in a ringing state with the dialed number (DNIS) transmitted to the System in Transmission 4. In another embodiment, the call status returned to the System from such query could be "in-progress" (answered) if the ANI was transmitted to the System in Transmission 4 after the call had been answered. In another embodiment, after the User receives the call in Incoming Call 2, and after completion of Call Answer 26, the User is informed that the System or another system managed by the User will be calling back the calling party while looking at real time network forwarding messages and other signaling after the current call terminates. This is done to verify that the received ANI transmitted in Incoming Call 2 is reachable by an outbound call and is, in fact, the number the User is using to place the call received in Incoming Call 2. A new outbound call is then placed to the ANI in Incoming Call 2 to the calling party to verify that the calling party is in fact reachable at the number that was received in Incoming Call 2. This outbound call is placed from a switch that uses SS7 services or with a VoIP service allowing for SIP-T messaging or other available network connection types. Such placement of the outbound call allows for the maximum amount of call progress messaging and number of details to be used by the System, so as to detect whether a call forward or other message is detected after the call is placed to the User, thus indicating the call was potentially not connected to the ANI from Incoming Call 2.

Storage 16 represents sorting by network codes, condition, and timing the responses received from the outbound call(s) for storage and later analysis for validity, pattern recognition, and other risk factors by such elements as network condition, time of day, call progress messages, response times by carrier, variability in status messages, latency in telecommunications networks, and statistical probabilities. The analyzed responses are then sorted and formatted with all other data obtained in API 6, Carrier Discovery 8, Line Type 10, Geo-location block 12, and Network Condition 14 as patterns in a database represented by Real Time Patterns 17.

In Real-Time Patterns database 17, all the data from Storage 16 that were persisted as patterns are stored as a database for analysis, represented by Compare 18. The following is an example of a valid ANI call pattern: a call placed to a Verizon (potentially Frontier) residential landline number that is in a previous GTE area in Oregon, does not have carrier-based voicemail activated as an optional feature, and is in an outbound ringing state will show as busy, while the same line that has carrier-based voicemail and call waiting features active on that line will show 1) a partial ring back message and then 2) an answer from the voicemail system within three seconds. In addition, the voice energy analysis and determination from the digital signal processing (DSP) would indicate that an answering device answered the call. In an invalid ANI call pattern, if it is determined that a human being answered, as taught by one or more complete ring cycles (six or more seconds after call is placed, with no call transfer message) along with a digital signal processor DSP determination of "human" answer, or if a ring without an answer pattern occurs, then the calling party in Incoming Call 2 would not have been calling the User in Incoming Call 2 because the call waiting feature is disabled on this line type in an outbound ringing transitional state.

In Compare 18, the pattern data stored in the Real-Time Patterns database 17 from Storage 16 are then compared against expected pattern results found in an Expected Patterns database 19. One or more patterns will be retrieved from Expected Patterns 19 based on information from Carrier Discovery 8, Line Type 10, and Geo-location 12. Patterns need not be exact to match between Expected Patterns database 19 and Real-Time Patterns database 17. Matching logic indicating the closest comparable candidate between the Expected Patterns database 19 and the Real-Time Patterns database 17 is chosen as an input to the statistical probability calculation. The pattern recognition can take into account any statistical reference tables. For example, if a call is in an outbound ringing state, there is a high degree of probability that the calling party is in fact calling the User.

The Expected Patterns database 19 is composed of, but not limited to, baseline repeatable call flow patterns that are built in advance utilizing run-time, call statistics, hour usage and traffic patterns, and call frequency tables. The Expected Patterns 19 baseline database is created through empirical testing and sampling of known conditions in an advance of run-time process including placing multiple calls to a series of telephone numbers representative of the call handling process of each of the carriers throughout their network. The data include all SS7, VoIP, or wireless network messages, including their ordering and timing between messages. In addition, the Expected Patterns 19 data call patterns may be defined and recorded for each switch type and location within a carrier's network for valid ANI scenarios, then invalid ANI scenarios. The call patterns may include every message received from the network with their associated time and duration facts while placing a call, as well as messages received from the digital signal processing (DSP) monitoring and analysis during the call with associated time and duration facts, first for a valid ANI pattern call, then for an invalid ANI pattern call. These patterns are built, tested, and persisted for each unique combination of carrier (Carrier Discovery 8) and line type (Line Type 10), and optionally of geo-location (Geo-location 12), as defined, for example, by serving switch. In addition to these elements, metadata are added to the call pattern data with elements such as time of day, frequency of recurrence, and statistical likelihood of call.

The Expected Patterns database 19 can be updated with each new ANI analysis while in run-time production, thereby creating a continuously learning system that provides ever-widening coverage of patterns. As part of the learning system, information stored in Storage 16 can be mined for additional information regarding new carrier information, new status, and new combinations of status messages and timing to be used to improve and enrich the Expected Patterns database 19. This creates a learning system that benefits all steps, especially Determine 20. The Expected Patterns database 19 will evolve through continued use of the System, adapting to telecommunications advances and creating a learning Expected Patterns database 19 with continuous feedback and updating.

In Determine 20, the results from Compare 18 are analyzed for normalcy deviation and statistical match to patterns and their timing or duration between messages or conditions. This analysis entails comparing the real time patterns to previously expected call patterns of valid and invalid calling party decomposing processes to make a degree of match interpretation. In turn, these and other attributes or elements may be used to generate a score or metric of the validity of an ANI or, alternatively, as a singular determination such as "valid" or "invalid" or as a tiered system such as "red," "yellow," "green." Each additional attribute or element such as carrier, line type, geo-location, time of day, match of real time pattern to expected pattern is assigned a weighted value as factors of a confidence metric. A confidence metric is produced using statistical methods to indicate the probability that the ANI is correct. The metric can be adjusted by application or by recipient, based on previously defined thresholds. For example, a bank may consider a VoIP telephone to be of significantly higher risk, whereas a voicemail application requiring verification may consider a VoIP telephone to be of no more significant risk than a landline or wireless. Determine 20 then sends the metric along with other optional data as outlined in Transmission 4, such as the time of day, trunk number, ANI II digits, dialed number information (DNIS), transaction number, or other information or data that may be helpful to the User, such as assisting in re-associating this transmission with calling party's call, is sent back to API 6.

In another embodiment, analysis of call detail and other records by telephone number may also create new variables, including velocity of calls measured and metrics, to determine whether a telephone number or set of telephone numbers has been dialed excessively by an ANI, which could be one indication of a fraud pattern. The velocity measure over a period could be set by an application. As an example, more than 15 call requests in a 15-minute period may indicate a brute force attack and could be consider higher risk. This attribute would be an element used in the scoring and metric of accuracy and security of an ANI. In another embodiment, the System may gather additional information that may be useful to the User from additional systems, vendors, processes, or metadata from one or more of the steps taught in this application, such as caller name, address, city, state, zip code, latitude/longitude, equipment type, caller location, IP address, or other information, in addition to predictive scores or metrics such as a fraud score, risk score, credit score, marketing score, affinity score, expansion score, or warning indicators for bankruptcy, deceased, or information from a consortium database such as calling velocity to multiple locations within a specified time period, or known frauds, and then passed to API 6 along with the ANI validity metric.

A Metric Received 22 block represents receipt from API 6 of a confidence metric developed, scored, and created in Determine 20, indicating the probability that the ANI from Incoming Call 2 is valid. API 6 sends such information to Metric Received 22 during the call (either pre-answer or post-answer) or at a later time (e.g., daily, weekly, or monthly), either individually or in aggregate in a batch data duration. Other data potentially received include optional data as outlined in Transmission 4, such as the time of day, trunk number, ANI II digits, dialed number information (DNIS), transaction number or other information or data that may be helpful to the System or the User such as assisting in re-associating this transmission with calling party's call.

Processed 24A and 24B blocks represent alternative processing of the metric and other information taught in Metric Received 22. The information delivered to and processed by Processed 24A is analyzed, scored, and acted upon in real time. This processing is performed according to a set of rules and processes by the User or by a third party rules engine such as ALI or any other commercially available system or any proprietary system that routes or makes decisions on the handling of any call, caller or call flow, in accordance with the recipient's algorithm, to the proper queue or IVR or agent, along with other fraud or call processing rules or procedures. The User's telephonic business rules engine may provide additional call scripting based on one or both of the metric and the additional information provided from the System or the User's business rules. The information delivered to and processed by Processed 24B is analyzed, scored, and acted upon as a batch process at, for example, the close of a business day. The processing is performed according to a set of rules and processes by the User or by a third party rules engine, as described above for Processed 24A.

A Call Answer block 26 represents answering by User of the call by an off hook or supervision signal or by data packet sent to the Users' providing telecommunications carrier. The call is then processed.

Relationship, Flow and Logic Between the Steps, Methods and Elements

The preferred relationship among elements, including preferred logic and chronological order, is shown in FIG. 1. The System performs ANI analysis to determine credibility of calling party information as the calling party's telephone or telephonic device is in a transitional state between an actual or a virtual on-hook condition and an answered condition. The System process preferably begins at Transmission 4 and ends at API 6. As shown in the diagram, Transmission 4 preferably occurs before API 6, which preferably occurs before Carrier Discovery 8, and so forth. However, the order of many of these steps may be changed. By way of example but not limitation, Line Type 10 may occur during or before Carrier Discovery 8, or during, or before Geo-location 12: Moreover, Network Condition 14 could occur during or before either or both of Carrier Discovery 8 and Line Type 10, as long as sufficient time remained to make the proper decision at Determine 20 before Call Answer 26.

In another embodiment, Carrier Discovery 8, Line Type 10, Geo-location 12, further, even Network Condition 14 could be altered or adjusted so that, if the data received in Line Type 10 were "prison telephone" or "pay-telephone," Carrier Discovery 8, Geo-locate 12, Network Condition 14 could be skipped or Geo-locate 12 could be preformed to verify the accuracy of data at Line Type 10 before moving to Network Condition 14 through Metric Received 22.

In another embodiment, the System may be implemented using software running on a local machine at the location of the User and incorporated into its own processes could use the disclosed method taught here to achieve the same trustworthiness and validity metric. This System can be envisioned as a hosted solution, with software installed on client's computer system having associated databases and network connections, or alternatively, as a hardware appliance, prepackaged server, or system including the System and necessary equipment to function installed on client premises. The solution may be a combination of the above-mentioned deployment options.

Figure 2:
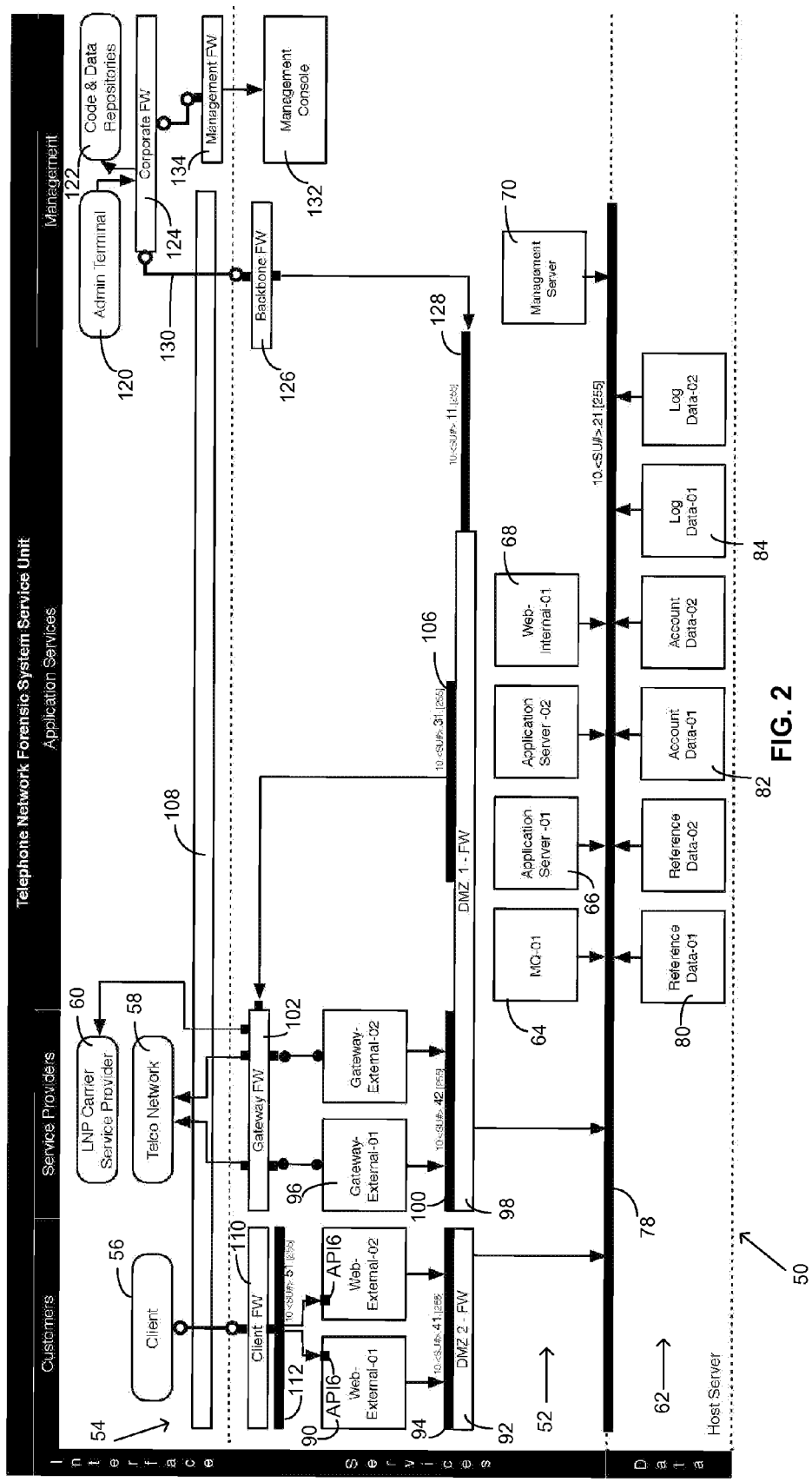
FIG. 2 is a block diagram of a telephone network forensic system service unit suitably configured to implement preferred methods of determining credibility of calling party number information performed in accordance with the hybrid process block and method step flow diagram of FIG. 1.

FIG. 2 is a block diagram illustrating a preferred telephone network forensic System 50 that uses telecommunication links to establish information request and data information communication paths among a User, a telecommunications network, and external data sources to determine credibility of calling party number information of an incoming call to the User. System 50 is configured with a services layer 52 that provides core application services in the credibility analysis of ANI of a call placed to a User. Services layer 52 is linked to an interface layer 54 to receive messages from a Client or User 56 requesting ANI processing and to communicate with a telecommunications network 58 to access call information data or place a test call to the supposed calling party number and an LNP carrier service provider 60 to access call information data. (Process blocks 2, 4, 22, 24A, 24B, and 26 shown in FIG. 1 relate to actions performed by or presented to User 56.) Services layer 52 is also linked to a data layer 62 for access to internally stored call information data used to analyze ANI.

Services layer 52 includes a message queue server 64 and an application server 66 that process incoming call ANI verification requests. Message queue server 64 receives incoming ANI and delivers the results obtained by operation of application server 66. Message queue server 64 supports the infrastructure for scalability and operational flow of System 50. Application system server 66 fulfills a call verification request directed by message queue server 64 by controlling and coordinating the ANI processing steps performed as outlined in FIG. 1. Message queue server 64 has an address to which all other servers provided in System 50 can direct requests for various processing tasks. Thus, the other servers in System 50 request information or deliver data through message queue server 64, which routes data and queries for processing by the appropriate system servers. This message queue server 64-centric architecture permits expansion of System 50 without disruption of operations of other system servers. A web internal server 68 runs queries through services layer 52 to perform internal test applications and emulate system performance without access to or by systems external to System 50. A management server 70 performs an administrative function of monitoring the overall system operational status (e.g., checking for faults in ANI processing) of servers in services layer 52 and data layer 62.

Services layer 52 is linked through a virtual switch 78 to data layer 62, which includes a reference data server 80 that contains a carrier database of internal information about operational and organizational characteristics for commercially accessible telecommunication carriers, valid NPA-NXX codes, valid NPA-NXX codes as to geo-location, line type, and other information characterizing proper ANI. (Process blocks 7, 10, and 12 shown in FIG. 1 relate to cooperative actions performed by application server 66 and reference data server 80.) An account data server 82 contains User account configuration information, and a log data server 84 tracks all transactions performed biSystem 50 for billing services, analysis, troubleshooting, and call progress message pattern updates. (Process blocks 16, 17, 18, and 19 shown in FIG. 1 relate to cooperative actions performed by application server 66, reference data server 80, and account data server 82.)

Services layer 52 and interface layer 54 are linked by multiple communication paths. Specifically, services layer 52 is linked to a web external server 90 through a firewall 92 and virtual switch 94, to a gateway external server 96 through a firewall 98 and virtual switch 100, and to a gateway firewall 102 through firewall 98 and virtual switch 106. These firewall-virtual switch combinations provide secure interface within services layer 52 and from interface layer 54 to services layer 52 and data layer 62. A User 56 located outside System 50, as indicated by outside world boundary 108, accesses System 50 through a client firewall 110 and virtual switch 112 to transmit to web external server 90 ANI associated with an incoming call verification request and to receive from web external server 90 results obtained after system processing of the ANI. The results obtained include a calculated confidence metric representing the credibility of the calling party number (FIG. 1, process block 20). Applications Programming Interface 6 is implemented by web external server 90 and defines a standard format by which communication takes place between web external server 90 and User 56. Services layer 52 interfaces with telecommunications network 58 (FIG. 1, process block 14) through gateway external server 96, firewall 98 and a virtual switch 100, and gateway firewall 102 to place a test call to the supposed calling party number of the incoming call to User 56. Services layer 52 interfaces with LNP carrier service provider 60 (FIG. 1, process block 8) to access (sometimes by purchase) call information data and to return accessed data to message queue server 64 through application server 66, to virtual switch 78 and firewall 98, through virtual switch 106 and gateway firewall 102.

An administrative terminal 120 and associated code and data repositories 122 are linked through a corporate firewall 124 at interface layer 54 to System 50 and are routed to services layer 52 through a backbone firewall 126 and virtual switch 128. This administrative link to System 50 allows corporate level management access, from across outside world boundary 108, to System 50 via a secure link 130 to, for example, perform demonstrations of system functionality and obtain operational status of System 50. A management console 132 in services layer 52 links administrative terminal 120 through a management firewall 134 to run the virtualization software of System 50.

FIG. 2 shows six servers in duplicate to indicate operational, equipment, and virtual appliance redundancy to ensure continuing service in the event of localized failure of any one of the six servers of System 50.

Basic and Optional Elements of Disclosed Method and System

The System can be implemented with all, part, or limited functionality of any method or step taught in this patent application or any combination. For instance, if User is interested only in validation of the ANI of wireless callers, and the LNP information learned in Carrier Discovery 8 is known to only provision wireless services, the Line Type 10 and possibly method Geo-Location 12 may not be required.

For situations in which the System had direct access to real time line status information by connections to carriers to disclose line status as taught is the first variation in Network Condition 14, the requirement to perform additional network status queries may not be required.

Another system benefitting from implementation of the disclosed method is telephones used by consumers or individuals at work. Frequently today, consumers and individuals at work are relying on Caller ID information to determine who is calling them. This is increasing important with a relatively new and disturbing trend called Phishing. Phishing is a practice of fraudulently taking on the persona of an institution, such as a bank, for the purpose of defrauding a consumer or an individual at work. As an example, a person receives a telephone call, and his or her Caller ID device displays "Bank of ABC." The "Bank" has called to verify credit card transactions for the security of the cardholder. The true caller is, however, in Eastern Europe and has no affiliation with Bank of ABC, but has simply used Caller ID spoofing to defraud the call recipient into believing his or her bank has placed the call. If the consumers or individuals at work fall prey to this fraud, the called person may share Personally Identifiable Information (PII) with the fraud perpetrator, allowing the fraud perpetrator to do financial harm by using the newly acquired PII from the victim. The disclosed method helps mitigate this fraudulent and costly practice.

It will be obvious to those having skill in the art that many changes may be made to the details of the above-described embodiments without departing from the underlying principles of the invention. The scope of the present invention should, therefore, be determined only by the following claims.

The invention claimed is:

1. A method of determining a source origin confidence metric of a calling party number or billing number associated with an incoming call from a telephonic device, comprising:
   receiving the calling party number or billing number;
   after receiving the calling party number or billing number and before the incoming call is answered, gathering operational status information associated with the calling party number or billing number, wherein gathering operational status information includes placing an outgoing call to the calling party number or billing number and receiving call progress messages associated with the outgoing call; and
   determining the source origin confidence metric for the calling party number or billing number.

2. The method of claim 1, further comprising receiving characteristics of the incoming call.

3. The method of claim 2, wherein characteristics of the incoming call include one or more of time of day, trunk number, ANI II digits, dialed number information, an identifier of an originating switch, SIP Header information, SIP routing information, transaction number, call frequency indicator, SS7 data or a unique call identifier.

4. The method of claim 1, further comprising determining whether the format of the calling party number or billing number is valid.

5. The method of claim 4, further comprising upon determining that the format of the calling party number or billing number is invalid, generating a message that indicates the calling party number or billing number is invalid.

6. The method of claim 1, further comprising obtaining a number of calls within a given timeframe that have been originated from the calling party number or billing number.

7. The method of claim 6, further comprising determining whether the number of calls within a given timeframe that have been originated from the calling party number or billing number exceeds a threshold.

8. The method of claim 7, further comprising upon determining that the threshold has been exceeded, generating a message that indicates the calling party number or billing number is invalid.

9. The method of claim 1, further comprising determining a carrier associated with the calling party number or billing number.

10. The method of claim 3, further comprising determining whether an NPA-NXX of the calling party number or billing number or whether the calling party number or billing number is associated with the originating switch.

11. The method of claim 10, further comprising upon determining that the NPA-NXX of the calling party number or billing number or that the calling party number or billing number is not associated with the originating switch, generating a message that indicates the calling party number or billing number is invalid.

12. The method of claim 1, further comprising:
   determining a line status for the calling party number or billing number.

13. The method of claim 12, further comprising when the line status for the calling party or billing number is determined to be answered, detecting audio energy to determine an answer condition.

14. The method of claim 13, further comprising upon determining the answer condition to be a human answer, generating a message that indicates the calling party number or billing number is invalid.

15. The method of claim 12, further comprising upon determining the answer condition to be ringing with no answer, generating a message that indicates the calling party number or billing number is invalid.

16. The method of claim 1, further comprising generating a call pattern for the outbound call.

17. The method of claim 16, wherein the call pattern includes data on timing between call progress messages.

18. The method of claim 16, wherein the outbound call pattern includes one or more of network conditions, line-status, call progress information, call progress messages, answer conditions, and timing of call progress messages.

19. The method of claim 16, wherein determining the source origin confidence metric of the calling party number or billing number is based on a comparison of the outbound call pattern to stored call patterns, characteristics, or both.

20. The method of claim 19, further comprising:
   identifying stored call patterns, characteristics, or both to be compared to the outbound call pattern based on one or more of line type, carrier, geo-location, or signaling patterns of the calling party number or the billing number.

21. The method of claim 1, wherein the source origin confidence metric is a probability that the calling party number or the billing number is valid.

22. The method of claim 1, wherein the source origin confidence metric indicates either the calling party number or the billing number is valid or invalid.

23. The method of claim 1, wherein the source origin confidence metric indicates a calling party number or billing number validity indicator, wherein the validity indicators comprise a static set of predetermined indicators.

24. The method of claim 23, wherein the set of predetermined indicators are red, green or yellow.

25. The method of claim 1, further comprising:
   adjusting the source origin confidence metric based on personal risk factors of an entity associated with the calling party number or billing number.

26. The method of claim 25, wherein the personal risk factors include one or more of fraud score, risk score, credit score, marketing score, affinity score, expansion score, or warning indicators for bankruptcy, or whether a person associated with the calling party number or billing number is deceased.

27. The method of claim 25, further comprising:
   retrieving consortium information from an external database.

28. The method of claim 27, wherein the external database includes data such as calling velocity to multiple locations within a specified time period for the calling party number or billing number, or known fraudulent calling party numbers or billing numbers.

29. The method of claim 16, further comprising updating a stored call patterns database based on the outbound call pattern.

30. The method of claim 1, further comprising:
   providing the source origin confidence metric to an entity receiving the incoming call.

31. The method of claim 30, wherein the source origin confidence matrix is provided to the entity receiving the incoming call in real-time or in batch mode.

32. A system for performing forensic analysis on calling party number information associated with an incoming call from a telephonic device, before the incoming call is answered, comprising:
   an interface for receiving calling party number information associated with the incoming call;

a memory configured to store a plurality of expected call patterns; and one or more processors configured to:
gather operational status information associated with the calling party number information, and
assign a source origin confidence metric to the calling party number using the operational status information and an expected call pattern in the plurality of expected call patterns.

33. The system of claim 32, wherein the interface is further configured to receive characteristics associated with the incoming call.

34. The system of claim 33, wherein the characteristics of the incoming call include one or more of trunk number, identifier of an originating switch, or transaction number.

35. The system of claim 32, wherein the processor is further configured to derive characteristics of the incoming call.

36. The system of claim 35, wherein the derived characteristics of the incoming call include one or more of carrier, geo-location of the call, or line type of the telephone device originating the incoming call.

37. The system of claim 36, wherein the processor is further configured to select the expected call pattern based on the derived characteristics of the incoming call.

38. The system of claim 32, wherein the calling party information includes the calling party number or billing number.

39. The system of claim 38 further comprising:
a device for initiating an outbound call to the calling party number or billing number.

40. The system of claim 39 further comprising:
a module for monitoring a set of call progress messages associated with the outbound call to the calling party.

41. The system of claim 40, wherein the processor is further configured to generate a call progress pattern based on the set of monitored call progress messages.

42. The system of claim 41, wherein the call progress pattern includes data on timing between call progress messages in the set of monitored call progress messages.

43. The system of claim 40, wherein the processor is further configured to compare the call progress pattern to the expected call pattern to determine the source origin confidence metric for the calling party number or the billing number.

44. The system of claim 32, wherein the operational status information includes a line status for the calling party number or billing number.

45. The system of claim 44, further comprising:
an audio energy detector configured to determine an answer condition associated with the line status.

46. The system of claim 38, wherein the source origin confidence metric is a probability that the calling party number or billing number is valid.

47. The system of claim 38, wherein the source origin confidence metric indicates either the calling party number or billing number is valid or invalid.

48. The system of claim 38, wherein the source origin confidence metric indicates a calling party number or billing number validity indicator, wherein the validity indicators comprise a static set of predetermined indicators.

49. The system of claim 48, wherein the set of predetermined source origin confidence metric indicators include red, green or yellow.

50. The system of claim 38, wherein the processor is further configured to adjust the source origin confidence metric based on personal risk factors of an entity associated with the calling party number or billing number.

51. The system of claim 50, wherein the personal risk factors include one or more of fraud score, risk score, credit score, marketing score, affinity score, expansion score, or warning indicators for bankruptcy, or whether a person associated with the calling party number is deceased.

52. The system of claim 32, further comprising one or more storage devices configured to store expected call patterns.

* * * * *